United States Patent
Yao et al.

(10) Patent No.: US 10,946,597 B2
(45) Date of Patent: Mar. 16, 2021

(54) METHOD FOR MEASURING A FLOWING PROPERTY IN A RESIN TRANSFER MOLDING SYSTEM

(71) Applicants: CORETECH SYSTEM CO., LTD., Chupei (TW); NATIONAL TSING HUA UNIVERSITY, Hsinchu (TW)

(72) Inventors: Yuan Yao, Hsinchu (TW); Tzu-Heng Chiu, Hsinchu (TW); Rong-Yeu Chang, Chupei (TW); Chia-Hsiang Hsu, Chupei (TW); Chih-Wei Wang, Chupei (TW); Shih-Po Sun, Chupei (TW); Sung-Wei Huang, Chupei (TW); Hsun Yang, Chupei (TW); Tsai-Heng Tsai, Chupei (TW)

(73) Assignees: Coretech System Co., Ltd., Chupei (TW); National Tsing Hua University, Hsinchu (TW)

( * ) Notice: Subject to any disclaimer, the term of this patent is extended or adjusted under 35 U.S.C. 154(b) by 0 days.

(21) Appl. No.: 16/667,562

(22) Filed: Oct. 29, 2019

(65) Prior Publication Data
US 2020/0061941 A1 Feb. 27, 2020

Related U.S. Application Data (62) Division of application No. 15/920,953, filed on Mar. 14, 2018, now abandoned.
(Continued)

(51) Int. Cl.
B29C 70/54 (2006.01)
G01N 15/08 (2006.01)
(Continued)

(52) U.S. Cl.
CPC ............ *B29C 70/546* (2013.01); *B29C 70/48* (2013.01); *B29C 70/54* (2013.01); *G01N 11/04* (2013.01);
(Continued)

(58) Field of Classification Search
CPC ....... B29C 70/443; B29C 70/46; B29C 70/48; B29C 70/546
See application file for complete search history.

(56) References Cited

U.S. PATENT DOCUMENTS 6,063,315 A 5/2000 Keller et al.
6,168,408 B1 1/2001 Boime et al.
(Continued)

FOREIGN PATENT DOCUMENTS

CN 102837435 A 12/2012
CN 103439235 A 12/2013
(Continued)

OTHER PUBLICATIONS

Chinese Office Action dated Dec. 4, 2019, issued in corresponding CN Application No. 201810418824.9, with partial translation, 7 pages.
(Continued)

*Primary Examiner* — Atul P. Khare
(74) *Attorney, Agent, or Firm* — Muncy, Geissler, Olds & Lowe, PC (57) ABSTRACT

The present disclosure provides a measurement method for a molding system comprising an upper mold and a lower mold forming a mold cavity. The method includes applying a pressure difference to a molding resin for driving the molding resin to flow into a preform in the mold cavity; detecting a flow front of the molding resin at a first position and a second position in the mold cavity; and calculating a flowing property of the molding resin based on the first
(Continued)

position, the second position, a travelling time of the flow front from the first position to the second position, and the pressure difference.

11 Claims, 10 Drawing Sheets

Related U.S. Application Data (60) Provisional application No. 62/502,150, filed on May 5, 2017.

(51) Int. Cl.
  *B29C 70/48* (2006.01)
  *G01N 11/06* (2006.01)
  *G01N 11/04* (2006.01)
  *B29C 33/00* (2006.01)

(52) U.S. Cl.
  CPC ......... *G01N 11/06* (2013.01); *G01N 15/0826* (2013.01); *B29C 2033/0005* (2013.01); *B29K 2995/0026* (2013.01)

(56) References Cited

U.S. PATENT DOCUMENTS

| | | | |
|---|---|---|---|
| 6,558,590 | B1 | 5/2003 | Stewart |
| 7,081,219 | B2 | 7/2006 | Stewart |
| 9,715,220 | B2 | 7/2017 | Yao et al. |
| 2002/0046596 | A1 | 4/2002 | Zhang et al. |
| 2011/0046771 | A1 | 2/2011 | Alms et al. |
| 2016/0116391 | A1 | 4/2016 | Yao et al. |
| 2016/0167276 | A1 | 6/2016 | Yao et al. |

FOREIGN PATENT DOCUMENTS

| | | |
|---|---|---|
| CN | 104297122 B | 2/2017 |
| TW | M510848 U | 10/2015 |
| TW | I511868 B | 12/2015 |
| TW | 201615391 A | 5/2016 |
| TW | M529837 U | 10/2016 |

OTHER PUBLICATIONS

T. James Wang, C. H. Wu, and L. James Lee, "In-plane permeability measurement and analysis in liquid composite molding," Polymer Composites, vol. 15, pp. 278-288, 1994.
K. K. Han, C. W. Lee, and B. P. Rice, "Measurements of the permeability of fiber preforms and applications," Composites Science and Technology, vol. 60, pp. 2435-2441, 2000.
A. S. Alexandros, I. K. Panagiotis, and K. P. Ivana, "A dielectric sensor for measuring flow in resin transfer moulding," Measurement Science and Technology, vol. 11, p. 25, 2000.
R. Pan, Z. Liang, C. Zhang, and B. Wang, "Statistical characterization of fiber permeability for composite manufacturing," Polymer Composites, vol. 21, pp. 996-1006, 2000.
Y. Luo, I. Verpoest, K. Hoes, M. Vanheule, H. Sol, and A. Cardon, "Permeability measurement of textile reinforcements with several test fluids," Composites Part A: Applied Science and Manufacturing, vol. 32, pp. 1497-1504, 2001.
D. R. Nielsen and R. Pitchumani, "Control of flow in resin transfer molding with real-time preform permeability estimation," Polymer composites, vol. 23, pp. 1087-1110, 2002.
L. Ding, C. Shih, Z. Liang, C. Zhang, and B. Wang, "In situ measurement and monitoring of whole-field permeability profile of fiber preform for liquid composite molding processes," Composites Part A: Applied Science and Manufacturing, vol. 34, pp. 779-789, 2003.
Y. J. Lee, J. H. Wu, Y. Hsu, and C. H. Chung, "A prediction method on in-plane permeability of mat/roving fibers laminates in vacuum assisted resin transfer molding," Polymer Composites, vol. 27, pp. 665-670, 2006.
Q. Liu, R. S. Parnas, and H. S. Giffard, "New set-up for in-plane permeability measurement," Composites Part A: Applied Science and Manufacturing, vol. 38, pp. 954-962, 2007.
G. Morren, S. Bossuyt, and H. Sol, "2D permeability tensor identification of fibrous reinforcements for RTM using an inverse method," Composites Part A: Applied Science and Manufacturing, vol. 39, pp. 1530-1536, 2008.
J. Li, X. Fu, C. Zhang, R. Liang, and B. Wang, "Optimal injection design for resin transfer molding with in situ permeability measurement and process simulation," Journal of Composite Materials, vol. 43, pp. 1695-1712, 2009.
B. Yenilmez and E. Murat Sozer, "A grid of dielectric sensors to monitor mold filling and resin cure in resin transfer molding," Composites Part A: Applied Science and Manufacturing, vol. 40, pp. 476-489, 2009.
S. Sharma and D. A. Siginer, "Permeability measurement methods in porous media of fiber reinforced composites," Applied Mechanics Reviews, vol. 63, pp. 020802-1-020802-19, 2010.
R. Arbter, J. M. Beraud, C. Binetruy, L. Bizet, J. Bréard, S. Comas-Cardona, et al., "Experimental determination of the permeability of textiles: A benchmark exercise," Composites Part A: Applied Science and Manufacturing, vol. 42, pp. 1157-1168, 2011.
R. Matsuzaki, S. Kobayashi, A. Todoroki, and Y. Mizutani, "Full-field monitoring of resin flow using an area-sensor array in a VaRTM process," Composites Part A: Applied Science and Manufacturing, vol. 42, pp. 550-559, 2011.
P. Carlone and G. S. Palazzo, "Unsaturated and Saturated Flow Front Tracking in Liquid Composite Molding Processes using Dielectric Sensors," Applied Composite Materials, vol. 22, pp. 543-557, 2015.
B.-J. Wei, Y.-C. Chuang, K.-H. Wang, and Y. Yao, "Model-Assisted Control of Flow Front in Resin Transfer Molding Based on Real-Time Estimation of Permeability/Porosity Ratio," Polymers, vol. 8, p. 337, 2016.
P. Simacek and S. G. Advani, ""Equivalent" permeability and flow in compliant porous media," Composites Part A: Applied Science and Manufacturing, vol. 80, pp. 107-110, 2016.
E. Ameri, G. Lebrun, and L. Laperrière, "In-plane permeability characterization of a unidirectional flax/paper reinforcement for liquid composite molding processes," Composites Part A: Applied Science and Manufacturing, vol. 85, pp. 52-64, 2016.
M. Devillard, K.-T. Hsiao, A. Gokce, and S. G. Advani, "On-line characterization of bulk permeability and race-tracking during the filling stage in resin transfer molding process," Journal of Composite Materials, vol. 37, pp. 1525-1541, 2003.
B.-J. Wei, Y.-S. Chang, Y. Yao, and J. Fang, "Online estimation and monitoring of local permeability in resin transfer molding," Polymer Composites, vol. 37, pp. 1249-1258, 2016.
Office Action dated Nov. 6, 2018, issued in corresponding Taiwan Application No. 107112683 (with English Abstracts of the Non-English References).

METHOD FOR MEASURING A FLOWING PROPERTY IN A RESIN TRANSFER MOLDING SYSTEM

CROSS-REFERENCE TO RELATED APPLICATION

This application is a divisional application of U.S. Non-Provisional application Ser. No. 15/920,953 filed Mar. 14, 2018, 15920953 and claims the benefit of U.S. Provisional Patent Application No. 62/502,150 filed May 5, 2017, which is incorporated herein by reference in its entirety.

TECHNICAL FIELD

The present disclosure relates to a system and method for measuring a flowing property in a resin transfer molding system, and more particularly, to a system and method for measuring a permeability/porosity ratio of a fiber preform in a resin transfer molding system.

DISCUSSION OF THE BACKGROUND

Resin transfer molding (RTM) is one of the most promising techniques for manufacturing high-performance fiber-reinforced plastic (FRP). In RTM, the permeability/porosity ratio of the fiber preform inside the mold is a critical process parameter, which varies with the geometric formation of the fiber reinforcement. This parameter affects the characteristic of resin flow and hence influences the final product quality. Various measurement systems have been developed for permeability estimation. However, most of the existing measurement systems assume that the material porosity is a constant and estimate the permeability of the entire fiber preform as a single value, while the local variations are often ignored.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One embodiment of the present disclosure provides a system for measuring a permeability/porosity ratio of a fiber preform in a molding system. In some embodiments of the present disclosure, the system comprises: an upper mold and a lower mold forming a mold cavity; a resin-supplying source configured to input a molding resin into a preform in the mold cavity; a detection device configured to detect a flow front of the molding resin at a first position and a second position in the mold cavity; and a computing device configured to calculate a flowing property of the molding resin flowing into the preform based on the first position, the second position, a travelling time of the flow front from the first position to the second position, and a pressure difference driving the flow front to travel from the first position to the second position.

In some embodiments of the present disclosure, the detection device is an image-capturing device configured to capture a first image and a second image of the flow front at the first position and the second position.

In some embodiments of the present disclosure, the upper mold is transparent, and the image-capturing device is disposed over the upper mold, and the first image and the second image are captured through the upper mold.

In some embodiments of the present disclosure, the system comprises a vacuum pump coupled to an outlet port of the mold cavity.

In some embodiments of the present disclosure, the system comprises a front pressure sensor coupled to an inlet port of the mold cavity.

In some embodiments of the present disclosure, the system comprises a rear pressure sensor coupled to an outlet port of the mold cavity.

In some embodiments of the present disclosure, the system comprises a pressure sensor disposed outside the mold cavity and configured to detect an internal pressure of the mold cavity.

In some embodiments of the present disclosure, the mold cavity does not contain an internal pressure sensor configured to detect an internal pressure of the mold cavity.

In some embodiments of the present disclosure, the computing device is configured to calculate the flowing property of the molding resin based on the following expression:

$$\frac{\tilde{K}}{\tilde{\phi}} = \frac{\mu G}{P_0(t_n - t_{n-1})} \int_{X_{n-1}}^{X_n} \frac{x^2 - X_{n-1}x}{(Gx-1)} dx$$

where $$\frac{\tilde{K}}{\tilde{\phi}}$$

represents a local ratio of permeability to porosity of the preform, $t_{n-1}$ and $t_n$ represent the first timing and the second timing, $X_n$ and $X_{n-1}$ represent the first position and the second position, $(t_n-t_{n-1})$ represents the travelling time, $P_0$ represents the pressure difference, $\mu$ represents the viscosity of the molding resin, and $$\frac{K_n}{\phi_n} \text{ and } \frac{K_{n-1}}{\phi_{n-1}}$$

represent global ratio of permeability to porosity.

Another embodiment of the present disclosure provides a method for measuring a permeability/porosity ratio of a fiber preform in a molding system, which comprises an upper mold and a lower mold forming a mold cavity. In some embodiments of the present disclosure, the method comprises steps of: applying a pressure difference to a molding resin for driving the molding resin to flow into a preform in the mold cavity; detecting a flow front of the molding resin at a first position and a second position in the mold cavity; and calculating a flowing property of the molding resin based on the first position, the second position, a travelling time of the flow front from the first position to the second position, and the pressure difference.

In some embodiments, the step of detecting the flow front of the molding resin includes capturing a first image and a second image of the flow front at the first position and the second position respectively.

In some embodiments, the first image and the second image are captured by an image-capturing device.

In some embodiments, the upper mold is transparent, and the image-capturing device is disposed over the upper mold, thereby the first image and the second image can be captured through the upper mold.

In some embodiments, the pressure difference is a constant when the flow front travels from the first position to the second position.

In some embodiments, the method further includes detecting an internal pressure of the mold cavity by a pressure sensor disposed outside the mold cavity.

In some embodiments, the step of applying the pressure difference to the molding resin is performed in an absence of a pressure sensor inside the mold cavity.

In some embodiments, the method further includes measuring a front pressure of the mold cavity by a front pressure sensor coupled to an inlet port of the mold cavity, and measuring a rear pressure of the mold cavity by a rear pressure sensor coupled to an outlet port of the mold cavity.

In some embodiments, the steps of measuring the front pressure and the rear pressure are performed outside the mold cavity.

In some embodiments, the step of calculating the flowing property of the molding resin includes deriving a local permeability to porosity ratio of the preform inside the mold cavity.

In some embodiments, the step of calculating the flowing property of the molding resin is performed based on the following expression:

$$\frac{\tilde{K}}{\tilde{\phi}} = \frac{\mu G}{P_0(t_n - t_{n-1})} \int_{X_{n-1}}^{X_n} \frac{x^2 - X_{n-1}x}{(Gx - 1)} dx$$

where $$\frac{\tilde{K}}{\tilde{\phi}}$$

represents a local permeability to porosity ratio of the preform between the first position and the second position, $\mu$ represents a viscosity of the molding resin, $P_0$ represents the pressure difference, $t_{n-1}$ represents a first timing at which the flow front of the molding resin is at the first position, $t_n$ represents a second timing at which the flow front of the molding resin is at the second position, $X_{n-1}$ represent the first position, $X_n$ represents the second position, and x represents a travelling distance of the flow front, wherein the foresaid expression is an integral with respect to the first position and the second position of the flow front; and where G is expressed in the following equation:

$$G = \frac{K_{n-1}\phi}{K\phi_{n-1}X_{n-1}}$$

where $$\frac{K_n}{\phi_n}$$

is a constant, and $$\frac{K_{n-1}}{\phi_{n-1}}$$

represents a global permeability to porosity ratio between an inlet port of the mold cavity and the first position of the flow front.

In some embodiments, the method further includes injecting the molding resin into the mold cavity at a constant pressure.

The present disclosure provides a measurement system and a method to measure the local values of the permeability/porosity ratio of a fiber preform in RTM reinforcements, which does not require a large number of pressure sensors to be mounted in the mold to obtain the local pressure gradients. In some embodiments of the present disclosure, at each sampling time point, the overall (global) permeability/porosity ratio of the fiber preform between a pressure-sensing site (e.g., the injection gate) and the flow front of the molding resin is calculated using a formula presented in Darcy's law. In the formula, the pressure difference along the flow path is known when the constant-pressure injection is employed, while the position of the flow front is acquired by a detecting device such as a visualization system (image-capturing device). Subsequently, the local ratio can be derived based on the relationship between the overall values and the local ratios.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a system and method for measuring a flowing property in a resin transfer molding system, and more particularly, to a system and method for measuring a permeability/porosity ratio of a fiber preform in a resin transfer molding system. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

The present disclosure provides a measurement system to measure the local values of the permeability/porosity ratio of a fiber preform in RTM reinforcements, which does not require a large number of pressure sensors to be mounted in the mold to obtain the local pressure gradients. In some embodiments of the present disclosure, at each sampling time point, the overall (global) permeability/porosity ratio of the fiber preform between a pressure-sensing site (e.g., the injection gate) and the flow front of the molding resin is calculated using a formula presented in Darcy's law. In the formula, the pressure difference along the flow path is known when the constant-pressure injection is employed, while the position of the flow front is acquired by a detecting device such as a visualization system (image-capturing device). Subsequently, the local ratio can be derived based on the relationship between the overall values and the local ratios. The feasibility of the proposed method is illustrated with the experimental results.

Instrumentation and Equipment

Figure 1:
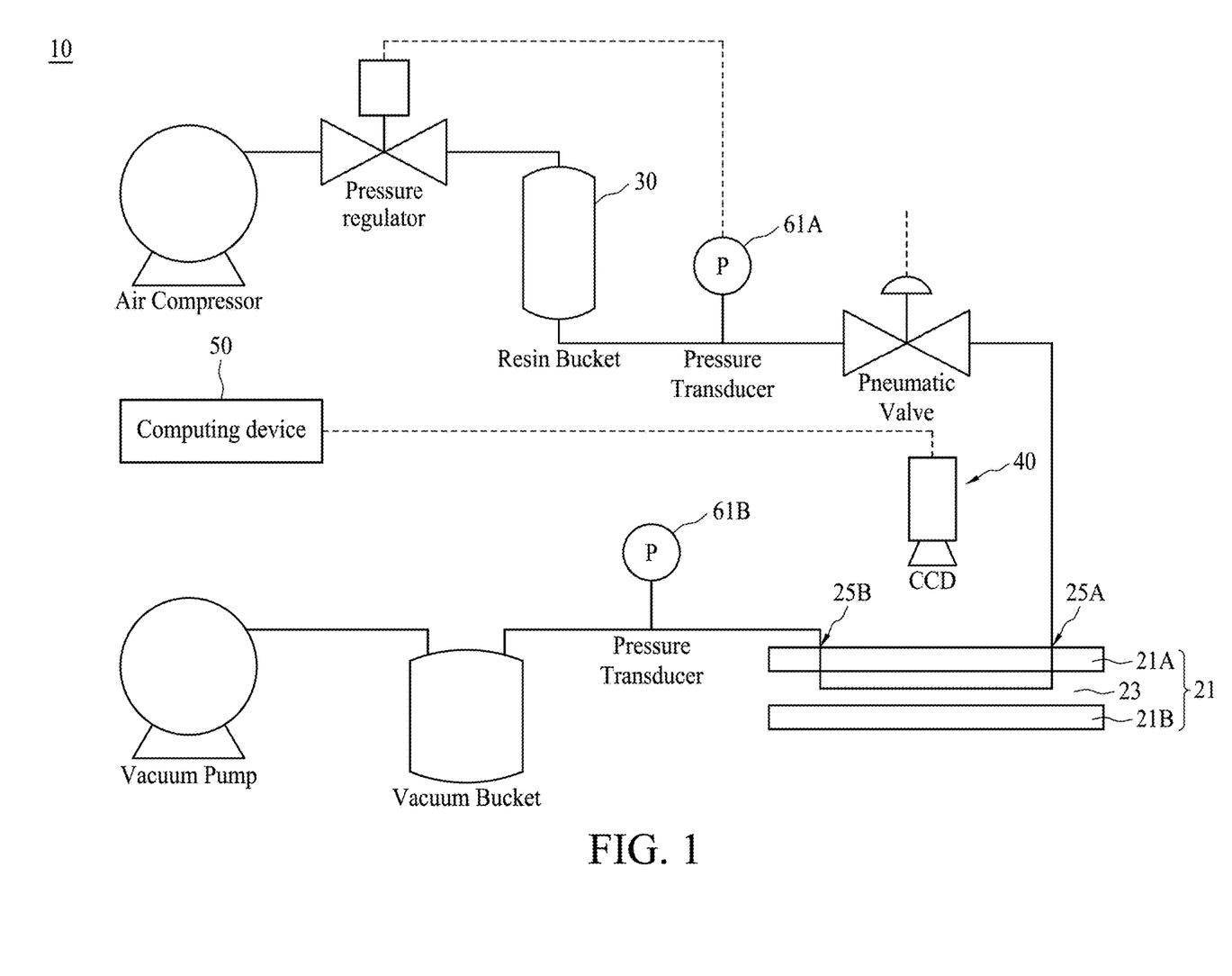
FIG. 1 shows a new measurement system for measuring the permeability/porosity ratio in the resin transfer molding in accordance with one embodiment of the present disclosure.

FIG. 1 shows a new measurement system 10 for measuring the permeability/porosity ratio in the resin transfer molding in accordance with a one embodiment of the present disclosure. In some embodiments, the measurement system 10 comprises a mold 21, a resin-supplying source 30, a detection device 40, and a computing device 50. The mold 21 includes an upper mold 21A and a lower mold 21B forming a mold cavity 23. The resin-supplying source 30 is configured to input a molding resin into a preform in the mold cavity 23. The detection device 40 is configured to detect a flow front of the molding resin at a first position and a second position in the mold cavity. The computing device 50 is configured to calculate a flowing property of the molding resin into the preform based on the first position, the second position, a travelling time of the flow front from the first position to the second position, and a pressure difference driving the flow front to travel from the first position to the second position.

In some embodiments, the molding resin is stored in the resin-supplying source 30 (resin bucket) linked to the inlet port 25A of the mold 21, while the outlet port 25B of the mold 21 is connected to a vacuum pump 60. During the vacuum-assisted infusion, the molding resin is driven by the pressure difference and injected into the mold 21 to impregnate the preform. In some embodiments, the upper mold 21A is transparent, facilitating the flow visualization, while the lower mold 21B is made of metal alloy, with the mold cavity 23 configured to contain the preform. In some embodiments, the dimension of the mold cavity 23 is 30 cm×12 cm×0.3 cm. During experiments, the flow front information was captured through the upper mold 23A in real time by the detection device 40 such as an image-capturing device (CCD camera) disposed over the upper mold 21A and stored in a National Instruments (NI) IMAQ frame grabber card.

In some embodiments, the measurement system 10 comprises a front pressure sensor 61A coupled to the inlet port 25A of the mold 21 and a rear pressure sensor 61B coupled to the outlet port 25B of the mold 21, while the pressure difference is generated based on the measurements of the front pressure sensor 61A and the rear pressure sensor 61B outside the mold 21. In other words, the measurement system 10 uses the pressure sensors disposed outside the mold cavity 23 to detect an internal pressure of the mold cavity 23, while the mold cavity 23 does not contain a pressure sensor.

Figure 2:
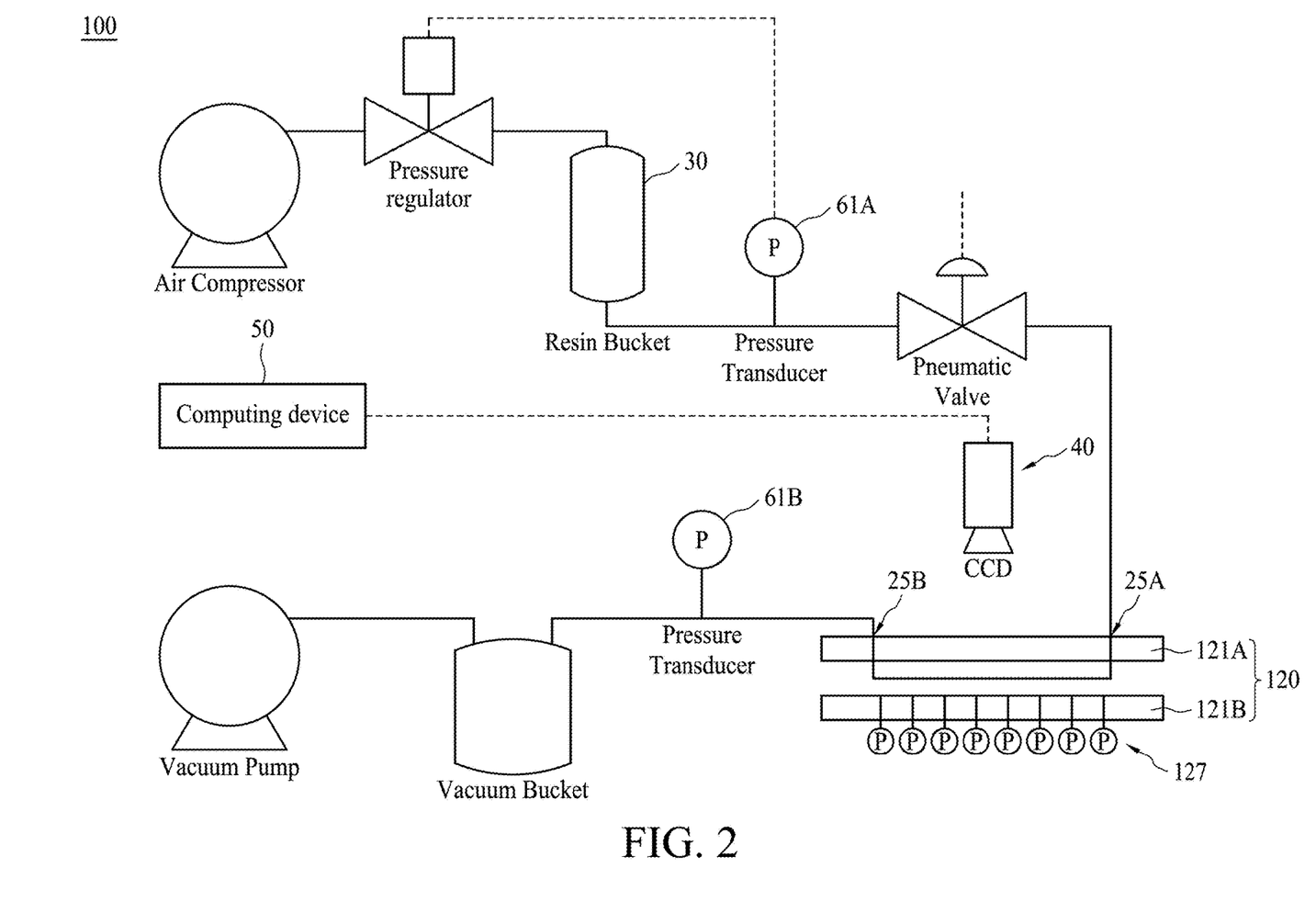
FIG. 2 shows a comparative measurement system for measuring the permeability/porosity ratio in the resin transfer molding in accordance with a comparative embodiment of the present disclosure.

FIG. 2 shows a comparative measurement system 100 for measuring the permeability/porosity ratio in the resin transfer molding in accordance with a comparative embodiment of the present disclosure. The comparative measurement system 100 in FIG. 2 is substantially the same as the present measurement system 10 in FIG. 1, except the comparative measurement system 100 uses a mold 120 having an upper mold 121A and a lower mold 121B with a pressure sensor array 127 embedded in the lower mold 121B to record the pressure distributions during infusion.

Figure 3:
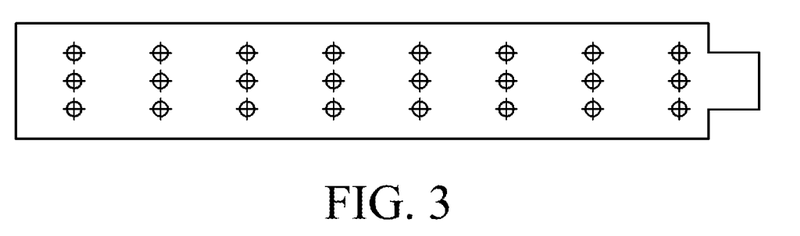
FIG. 3 and FIG. 4 show the pressure sensor array in FIG. 2.
Figure 4:
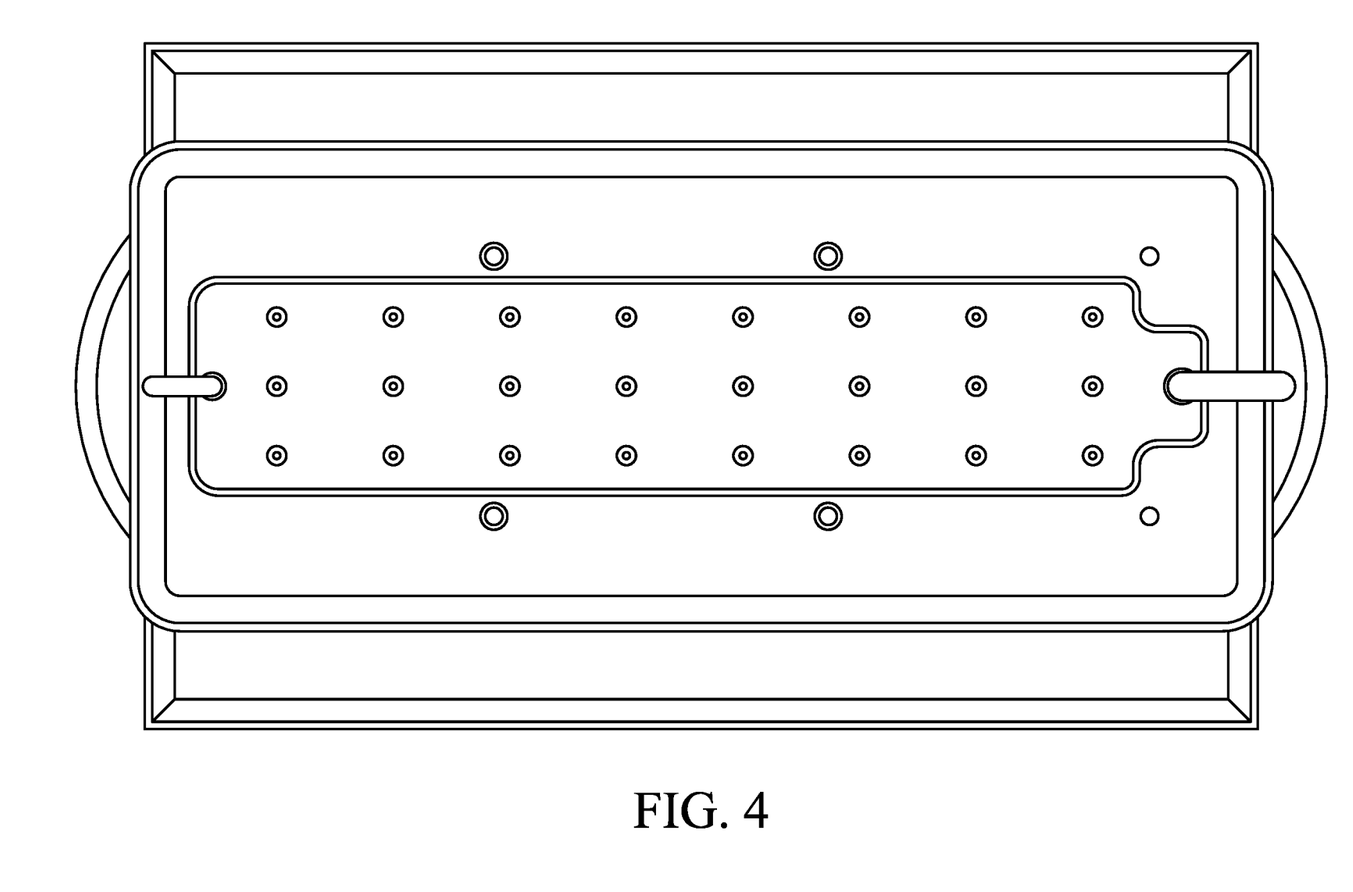

FIG. 3 and FIG. 4 show the pressure sensor array in FIG. 2. The pressure sensor array is a 3×8 pressure sensor array embedded in the lower mold 121B. It should be noted that these sensors are not needed by the present measurement system 10 in FIG. 1. The pressure sensor array are utilized to get the information necessary for conducting the method developed in the publication (see B. J. Wei, Y. S. Chang, Y. Yao, and J. Fang, "Online estimation and monitoring of local permeability in resin transfer molding," *Polymer Composites*, vol. 37, pp. 1249-1258, 2016). After the information is gathered, the feasibility of the proposed scheme in FIG. 1 can be verified through the comparison with the gathered information in FIG. 2. In the present disclosure, LabVIEW is used to integrate the hardware devices in FIG. 1 and FIG. 2. The positions of the pressure sensors can be observed through the transparent upper mold 121A.

Figure 5:
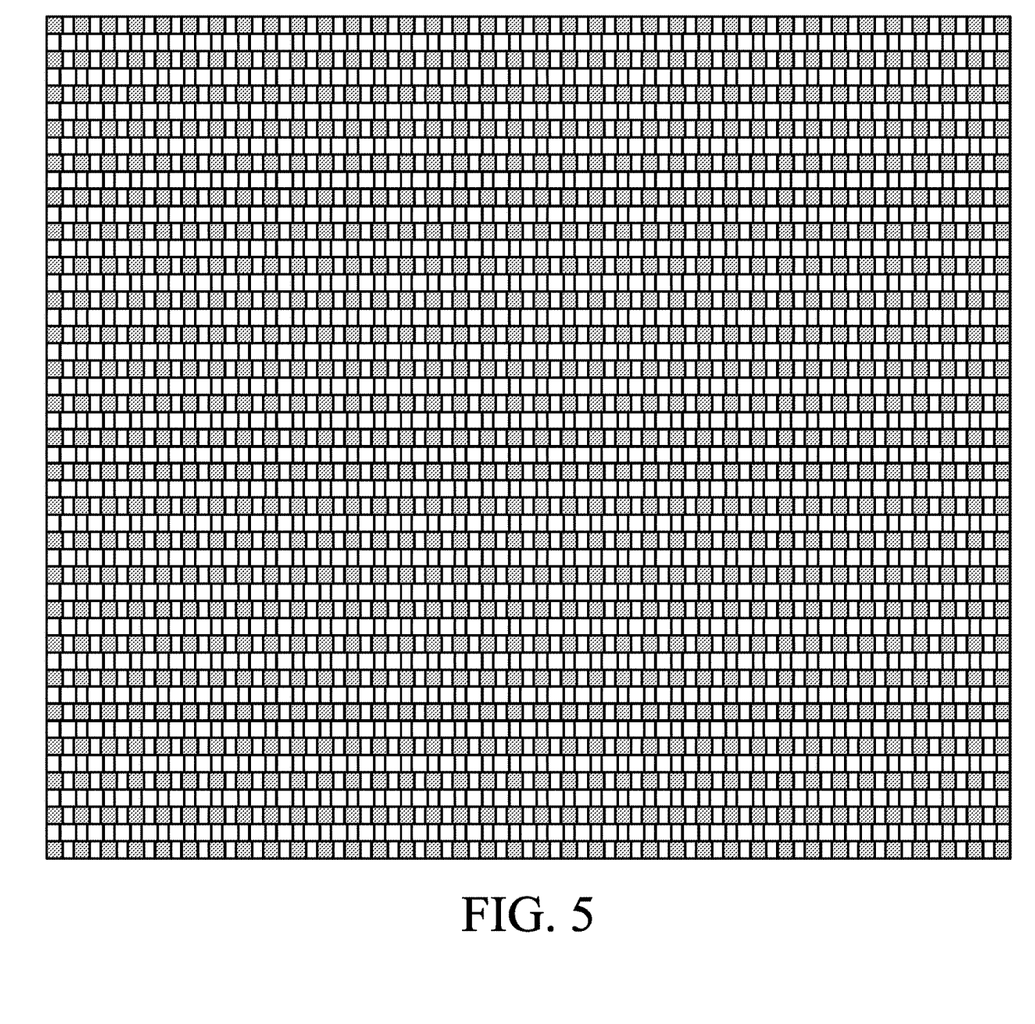
FIG. 5 shows a piece of fiber mat serving as the fiber preform.

FIG. 5 shows a piece of fiber mat serving as the fiber preform. The epoxy resin is adopted as the raw material in the experiments, wherein the epoxy resin has a viscosity of about 550 cp at room temperature. The preform is composed of glass fibers, which are commonly used as a reinforcing material for polymer composites.

Figure 6:
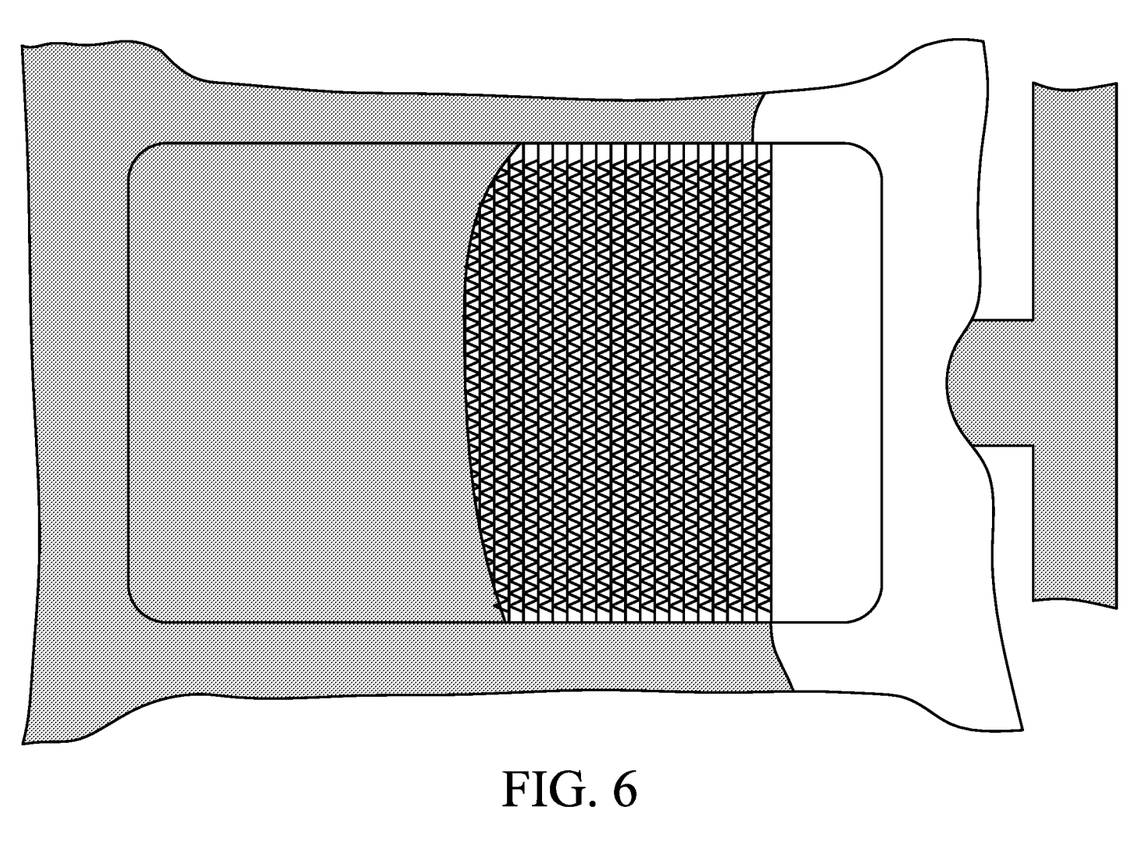
FIG. 6 and FIG. 7 show the images captured by the detection device in accordance with a comparative embodiment of the present disclosure.
Figure 7:
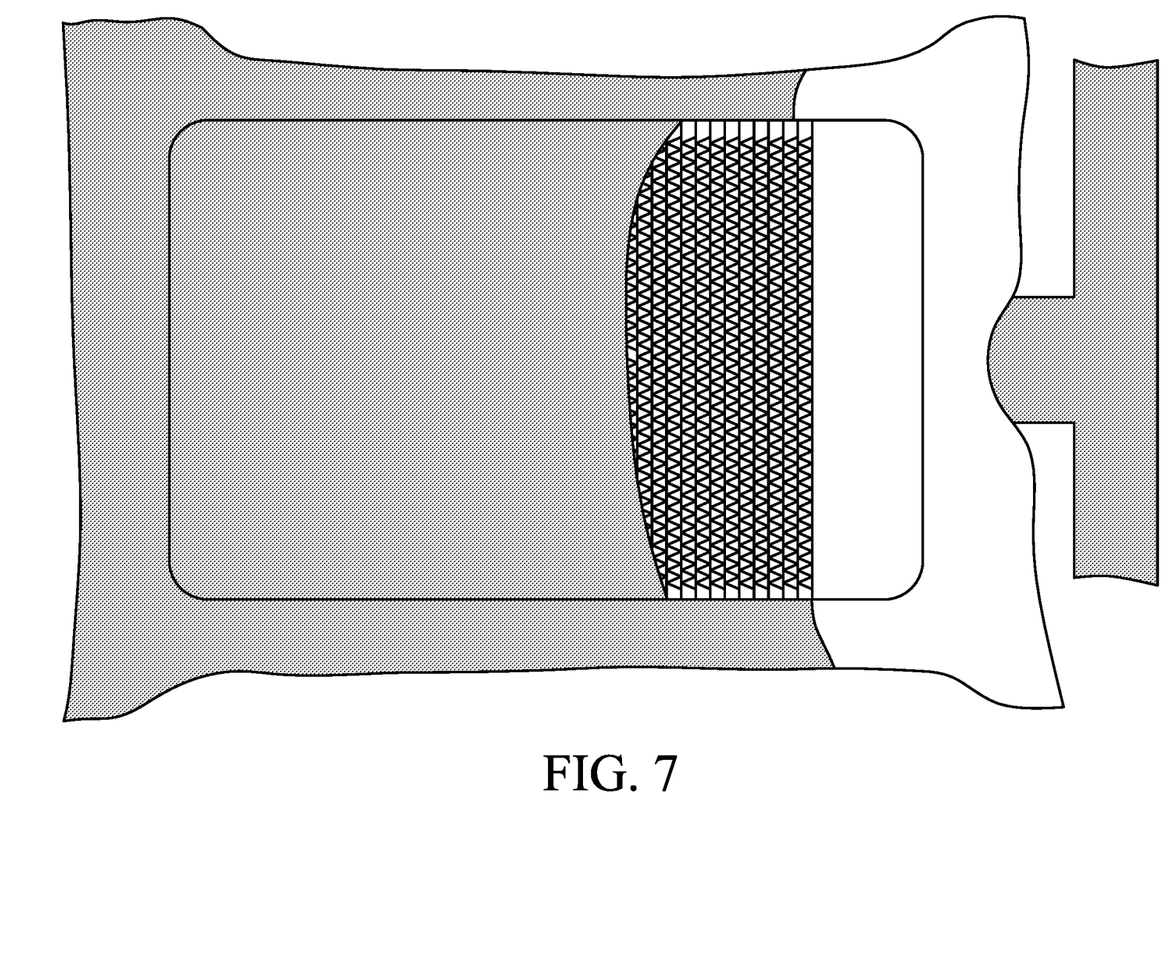

FIG. 6 and FIG. 7 show the images captured by the detection device 40 in accordance with a comparative embodiment of the present disclosure. The detection device 40 is an image-capturing device (CCD) configured to capture a first image, shown in FIG. 6, and a second image, shown in FIG. 7, showing the flow front of the molding resin at the first position and the second position, respectively.

Figure 8:
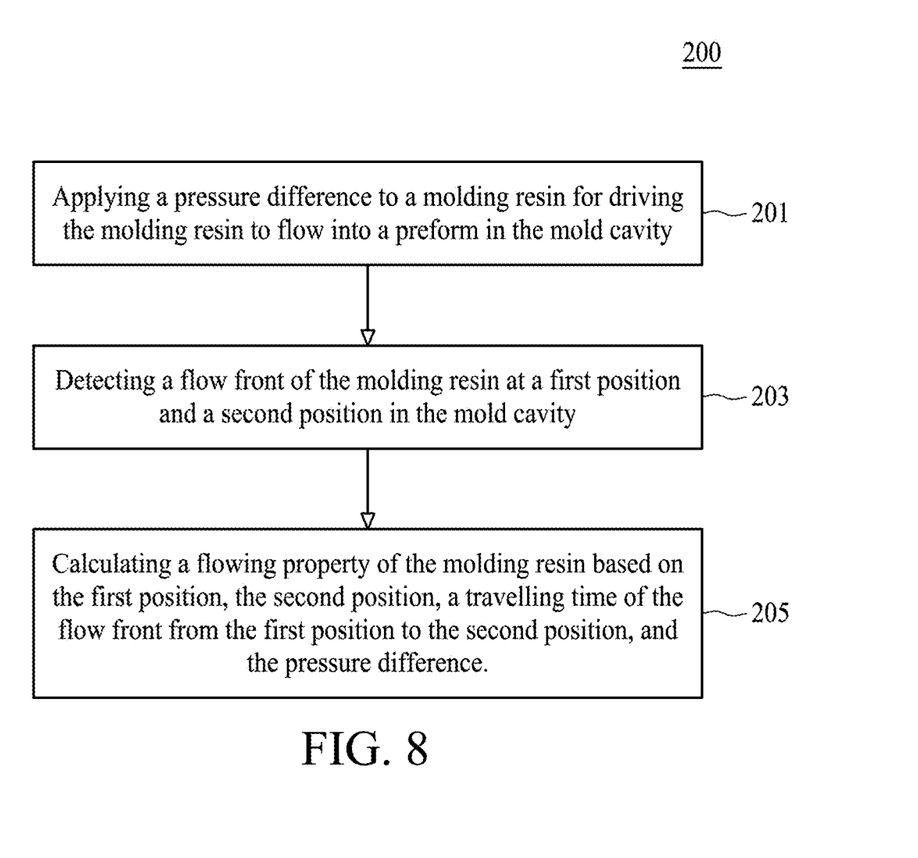
FIG. 8 is a flow chart of a method for measuring the permeability/porosity ratio in the resin transfer molding in accordance with a comparative embodiment of the present disclosure.

FIG. 8 is a flow chart of a method 200 for measuring the permeability/porosity ratio in the resin transfer molding in accordance with a comparative embodiment of the present disclosure. In some embodiments, the method 200 comprises an operation 201 of applying a pressure difference to a molding resin for driving the molding resin to flow into a preform in the mold cavity; an operation 203 of detecting a flow front of the molding resin at a first position and a second position in the mold cavity; and an operation 205 of calculating a flowing property of the molding resin based on the first position, the second position, a travelling time of the flow front from the first position to the second position, and the pressure difference.

Measurement of Local Permeability/Porosity Ratio

In this section, an in situ measurement system and a method are proposed for measuring the local values of the permeability/porosity ratio of the fiber preform used as reinforcement in RTM. The basic idea is as follows. At each sampling time point after the infusion begins, the overall value of the ratio of permeability to porosity between the injection gate and the current flow front position is calculated. Next, the local value between two consecutive flow front positions can be derived from the relationship between the values of the overall ratio and the local ratios. The details are presented below.

The motion of incompressible fluids flowing through porous fiber structure is governed by the well-known Darcy's law (1) and the continuity equation (2) as follows:

$$u = -\frac{1}{\mu} K \cdot \nabla P \quad (1)$$

$$\nabla \cdot u = 0 \quad (2)$$

where u is the vector of Darcy velocity, K is the permeability tensor, $\mu$ is the viscosity of the resin, and $\nabla P$ denotes the pore-average pressure gradient inside the mold. These equations describe the macroscopic relationship between Darcy velocity and pressure drop. Therefore, they are often used in permeability estimation.

In this study, linear flow experiments were conducted in a rectangular mold. Therefore, it is reasonable to make the following assumptions (see S. G. Advani and E. M. Sozer, *Process Modeling in Composites Manufacturing*. New York: Marcel Dekker, 2002): flow coordinate is along the principle direction of fiber; resin flows along a one-dimensional direction, i.e., the x-axis; and the z-axis scale is ignored. The behavior of the resin flow is then described with the following simplified equation which is in one dimension:

$$u = -\frac{K}{\mu}\left(\frac{\partial P}{\partial x}\right) \quad (3)$$

where u, K and $$\frac{\partial P}{\partial x}$$

are the Darcy velocity, permeability and pressure gradient along the flow coordinate, respectively.

The above equation cannot be used in permeability estimation directly, because the flow front velocity captured by the CCD camera is the seepage velocity instead of the Darcy velocity. The relationship between these two types of velocity is $$u = v\phi \quad (4)$$

where v is the seepage velocity and $\phi$ is the porosity of the fibers. By combing (3) and (4), it can be derived that $$v = \frac{dx}{dt} = -\frac{K}{\phi\mu}\left(\frac{\partial P}{\partial x}\right) \quad (5)$$

In the interval between the injection gate and the flow front along the x-axis, the overall permeability K and the overall porosity $\phi$ are represented by constants. When resin is injected at constant pressure, the pressure gradient $$\frac{\partial P}{\partial x}$$

is approximated as $$\frac{\partial P}{\partial x} = -\frac{P_0}{x} \quad (6)$$

where $P_0$ is the injection pressure and x is the distance the flow front has traveled. Substituting (6) into (5) and performing integration with regard to the time, (7) is obtained:

$$x^2 = \frac{2KP_0}{\phi\mu}t \quad (7)$$

where t is the travelling time of the resin flow. Clearly, there is a linear relationship between $x^2$ and t, from whose slope S the permeability/porosity ratio is obtained as $$\frac{K}{\phi} = \frac{S\mu}{2P_0} \quad (8)$$

When the overall porosity $\phi$ is a known constant, K can be calculated.

The above equation only evaluates the value of the overall permeability, while the local variations are ignored. In practice, both the permeability and porosity may vary with location in an arbitrary manner. Therefore, it is necessary to derive an algorithm to extract the local information. Denoting the flow front position at time $t_n$ as $X_n$, the following equation can be obtained from Darcy's law:

$$v = \frac{dx}{dt} = -\frac{\tilde{K}}{\tilde{\phi}\mu}\left(\frac{-P_{n-1}}{x - X_{n-1}}\right) \quad (9)$$

where $\tilde{K}$ and $\tilde{\phi}$ are the local permeability and porosity between $X_{n-1}$ and $X_n$ respectively, x is the flow front position at time t, $X_{n-1} < x \leq X_n$, $P_{n-1}$ denotes the pressure at $X_{n-1}$ at time t, and is an approximation of $$\frac{-P_{n-1}}{x - X_{n-1}}$$

is an approimation of $$\frac{\partial P}{\partial x}.$$

In (9), both x and $P_{n-1}$ are functions of time t, so the value of $$\frac{\tilde{K}}{\tilde{\phi}}$$

cannot be calculated directly. In order to extract more information, the following equations are established:

$$v = \frac{K}{\phi\mu}\frac{P_0}{x} \quad (10)$$

$$v = \frac{K_{n-1}}{\phi_{n-1}\mu}\frac{(P_0 - P_{n-1})}{X_{n-1}} \quad (11)$$

which are also based on Darcy's law. Here, K and $\phi$ are the overall permeability and porosity between the injection gate and the flow front position at time t, respectively. $K_{n-1}$ and $\phi_{n-1}$ are defined in a similar way, and are the overall permeability and porosity between the injection gate and $X_{n-1}$, respectively. Combining (10) and (11), $$\frac{K}{\phi\mu}\frac{P_0}{x} = \frac{K_{n-1}}{\phi_{n-1}\mu}\frac{(P_0 - P_{n-1})}{X_{n-1}} \quad (12)$$

To simplify the calculation, $$\frac{K}{\phi}$$

is approximated with a constant according to (13):

$$\frac{K}{\phi} = \frac{1}{2}\left(\frac{K_n}{\phi_n} + \frac{K_{n-1}}{\phi_{n-1}}\right) \quad (13)$$

It is noted that the values of both $$\frac{K_n}{\phi_n} \text{ and } \frac{K_{n-1}}{\phi_{n-1}}$$

can be obtained from (8). Therefore, the approximate value of $$\frac{K}{\phi}$$

is also known. Denoting the constant term $$\frac{K_n \phi}{K \phi_n X_n}$$

by G, i.e.

$$G = \frac{K_{n-1}\phi}{K\phi_{n-1}X_{n-1}} \quad (14)$$

it is derived from (12) that $$P_{n-1} = \frac{P_0(Gx - 1)}{Gx} \quad (15)$$

Substituting (15) into (9) gives $$\frac{dx}{dt} = -\frac{\tilde{K}P_0}{\tilde{\phi}\mu}\left(\frac{Gx - 1}{(x - X_{n-1})Gx}\right) \quad (16)$$

By transposition of terms and integrating, (17) yields:

$$\int_{X_{n-1}}^{X_n}\frac{x^2 - X_{n-1}x}{(Gx - 1)}dx = \frac{\tilde{K}P_0}{\tilde{\phi}\mu G}\int_{t_{n-1}}^{t_n}dt \quad (17)$$

That is $$\frac{\tilde{K}}{\tilde{\phi}} = \frac{\mu G}{P_0(t_n - t_{n-1})}\int_{X_{n-1}}^{X_n}\frac{x^2 - X_{n-1}x}{(Gx - 1)}dx \quad (18)$$

From the above derivation, it is clear that the flowing property (the local ratio of permeability to porosity), $$\frac{\tilde{K}}{\tilde{\phi}},$$

can be obtained with the values of $t_n$, $t_{n-1}$, $X_{n-1}$, $X_n$, $P_0$, $\mu$, $$\frac{K_n}{\phi_n} \text{ and } \frac{K_{n-1}}{\phi_{n-1}}$$

known. Here, $t_{n-1}$ and $t_n$ are sampling time points (the first timing and the second timing), which are selected by the operator. $X_n$ and $X_{n-1}$ are positions (the first position and the second position) measured by the visualization system (detection device). The pressure difference $\Delta P(P_0-0)$ is 1.013 bar, i.e. 1 atm, in the experiments. The viscosity of the resin, μ, as measured before the experiments, ranged from 650 cp to 1200 cp.

$$\frac{K_n}{\phi_n} \text{ and } \frac{K_{n-1}}{\phi_{n-1}}$$

can be estimated during the experiments as explained previously. No local information of pressure is needed. Therefore, it is not necessary to mount pressure sensors inside the mold cavity as shown in the comparative measurement system shown in FIG. 2.

Results and Discussions

In this section, two experiments are presented to demonstrate the effectiveness of the proposed methods. In the first experiment, the permeability and porosity of the preform were nearly uniform; while in the second case, variations in the material properties were significant. For the purpose of comparison, two other methods were also used as reference, including one method that can be used to measure the local permeability/porosity ratio with the help of a pressure sensor array (see B. J. Wei, Y. S. Chang, Y. Yao, and J. Fang, "Online estimation and monitoring of local permeability in resin transfer molding," Polymer Composites, vol. 37, pp. 1249-1258, 2016) and another suited to overall permeability estimation (see Y. J. Lee, J. H. Wu, Y. Hsu, and C. H. Chung, "A prediction method on in-plane permeability of mat/roving fibers laminates in vacuum assisted resin transfer molding," Polymer Composites, vol. 27, pp. 665-670, 2006).

Nearly-Uniform Fiber Preform

In the first experiment, the reinforcement preform was constructed by stacking nine layers of fiber mats, while the injection pressure was set to 1.013 bar. The total infusion time was 374 seconds. The viscosity of the resin was measured to be 560 cp. In this case, the permeability was believed to be nearly constant, because there was no irregular arrangement of fiber mats.

Figure 9:
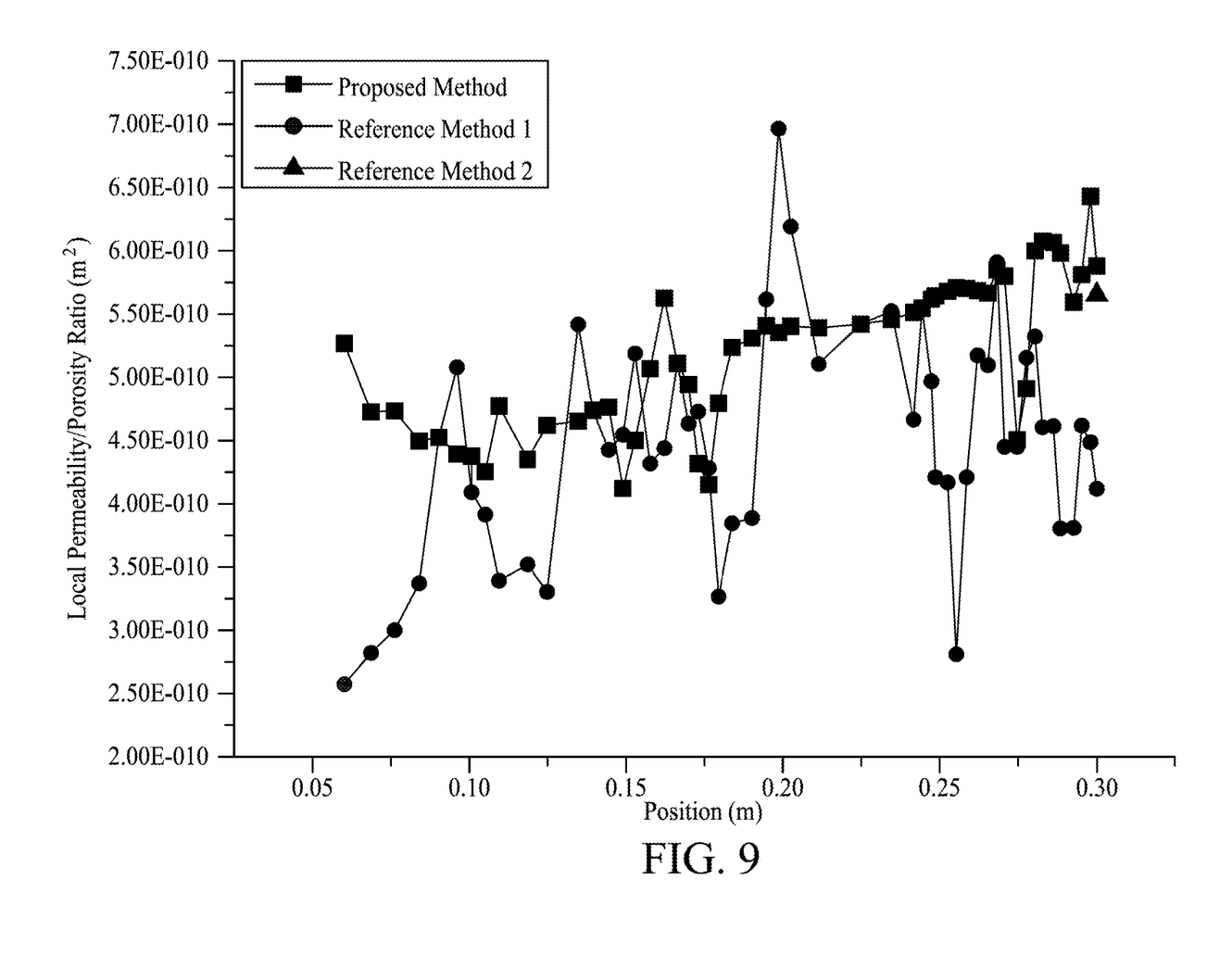
FIG. 9 shows experimental results of a nearly-uniform fiber preform.

FIG. 9 shows experimental results of a nearly-uniform fiber preform. The measurement started eight seconds after the injection began. The sampling time interval was set to six seconds. The results of three different methods are shown in FIG. 9, where the squares are the local permeability/porosity ratio values measured by the proposed method of the present disclosure and the circles are the measurements obtained by Reference Method 1 introduced in the publication (see B. J. Wei, Y. S. Chang, Y. Yao, and J. Fang, "Online estimation and monitoring of local permeability in resin transfer molding," Polymer Composites, vol. 37, pp. 1249-1258, 2016). These two methods gave similar trends in the results, indicating that there was no statistical change point in the local permeability/porosity ratio of the preform. Such analysis confirms the known fact. In addition, the statistical properties, such as mean and standard deviation, can be estimated from these results. The triangle in FIG. 9 represents the result of using Reference Method 2 (see Y. J. Lee, J. H. Wu, Y. Hsu, and C. H. Chung, "A prediction method on in-plane permeability of mat/roving fibers laminates in vacuum assisted resin transfer molding," Polymer Composites, vol. 27, pp. 665-670, 2006). The result was only obtained at the end of the infusion, because this method only provided the overall information of material properties and did not reflect the local details.

Non-Uniform Fiber Preform

In the second experiment, the preform was non-uniform, half of which was made of ten layers of fiber mats, while the other half contained only nine layers. Because the volume of the mold cavity was a constant, it was expected that a significant shift would be observed in the measurement values of the local permeability/porosity ratio. The resin viscosity was 550 cp in this case, while the injection pressure was 1.013 bar. Similar to the first case, the sampling interval was six seconds. The first measurement was conducted eight seconds after the injection began.

Figure 10:
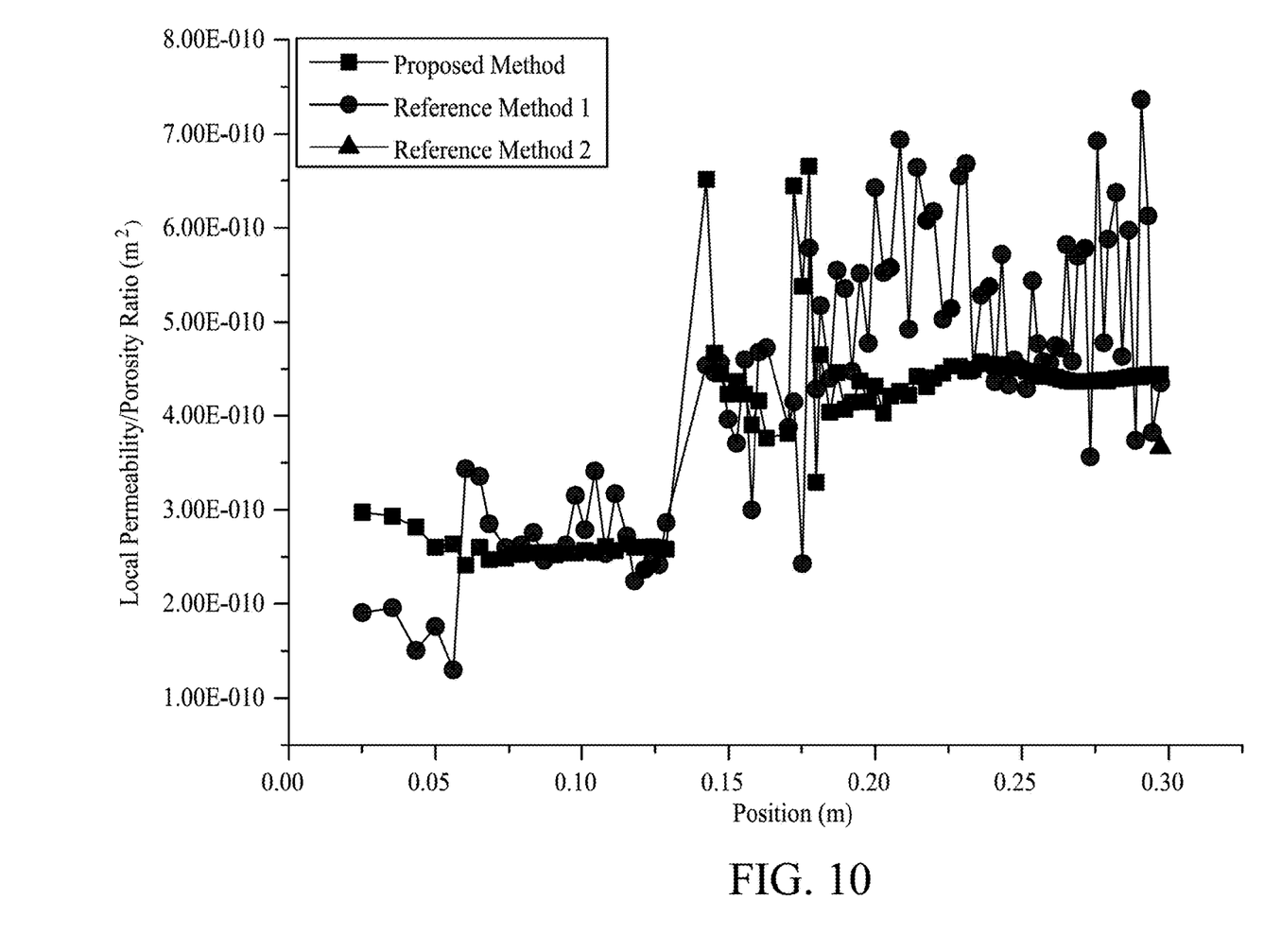
FIG. 10 shows experimental results of a uniform fiber preform.

FIG. 10 shows experimental results of a uniform fiber preform. It is clear that both the proposed method and Reference Method 1 captured the shift around 13 cm, indicating the change in material properties. The local permeability/porosity ratio before the switching point was significantly smaller than that after the shift. It is also observed that, in this case, the proposed method produced a smoother trend than that given by Reference Method 1. A possible reason is that the local pressure readings used by Reference Method 1 suffered from measurement noise, making the measurement results of the local permeability/porosity ratio prone to noise-caused inaccuracies. In contrast, the proposed method only utilizes the information of injection pressure, reducing the chance of errors. Reference Method 2 was not suited to this case, because it only gave an overall impression of the physical properties of the materials under investigation and did not provide any details of the local information.

CONCLUSIONS

In RTM manufacturing, resin flow behaviors are largely determined by the permeability and porosity of the reinforcement preform. Hence, the ratio of permeability to porosity is critically important to both process simulation and flow control. Most of the existing studies focus on global material properties and ignore local variability, although the local characteristics often determine product quality. In the present disclosure, an in-situ measurement approach of local permeability/porosity ratio, which does not require complex sensor design, is proposed. The experimental results illustrate the feasibility of the proposed method.

In Brief, the present disclosure provides a measurement system and a method to measure the local values of the permeability/porosity ratio of a fiber preform in RTM reinforcements, which does not require a large number of pressure sensors to be mounted in the mold to obtain the local pressure gradients. In some embodiments of the present disclosure, at each sampling time point, the overall (global) permeability/porosity ratio of the fiber preform between a pressure-sensing site (e.g., the injection gate) and the flow front of the molding resin is calculated using a formula presented in Darcy's law. In the formula, the pressure difference along the flow path is known when the constant-pressure injection is employed, while the position of the flow front is acquired by a detecting device such as a visualization system (image-capturing device). Subsequently, the local ratio can be derived based on the relationship between the overall values and the local ratios.

One aspect of the present disclosure provides a system for measuring a permeability/porosity ratio of a fiber preform in a molding system. In some embodiments of the present disclosure, the system comprises: an upper mold and a lower mold forming a mold cavity; a resin-supplying source configured to input a molding resin into a preform in the mold cavity; a detection device configured to detect a flow front of the molding resin at a first position and a second position in the mold cavity; and a computing device configured to calculate a flowing property of the molding resin into the preform based on the first position, the second position, a travelling time of the flow front from the first position to the second position, and a pressure difference driving the flow front to travel from the first position to the second position.

Another aspect of the present disclosure provides a method for measuring a permeability/porosity ratio of a fiber preform in a molding system, which comprises an upper mold and a lower mold forming a mold cavity. In some embodiments of the present disclosure, the method comprises steps of: applying a pressure difference to a molding resin for driving the molding resin to flow into a preform in the mold cavity; detecting a flow front of the molding resin at a first position and a second position in the mold cavity; and calculating a flowing property of the molding resin based on the first position, the second position, a travelling time of the flow front from the first position to the second position, and the pressure difference.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A measurement method for a molding system, the molding system comprising an upper mold and a lower mold forming a mold cavity, the method comprising:
   applying a pressure difference to a molding resin for driving the molding resin to flow into a preform in the mold cavity;
   detecting a flow front of the molding resin at a first position and a second position in the mold cavity by a detection device disposed over the upper mold;
   detecting an internal pressure of the mold cavity by a pressure sensor disposed outside the mold cavity; and
   calculating a local ratio of permeability to porosity of the preform based on the first position, the second position, a travelling time of the flow front from the first position to the second position, and the pressure difference,
   wherein the mold cavity does not contain an internal pressure sensor configured to detect an internal pressure of the mold cavity.

2. The measurement method of claim 1, wherein the step of detecting the flow front of the molding resin includes capturing a first image and a second image of the flow front at the first position and the second position respectively.

3. The measurement method of claim 2, wherein the first image and the second image are captured by an image-capturing device as the detection device.

4. The measurement method of claim 3, wherein the upper mold is transparent, the first image and the second image being captured through the upper mold.

5. The measurement method of claim 1, wherein the pressure difference is constant during said travelling of the flow front from the first position to the second position.

6. The measurement method of claim 1, further comprising measuring a front pressure of the mold cavity by a front pressure sensor coupled to an inlet port of the mold cavity, and measuring a rear pressure of the mold cavity by a rear pressure sensor coupled to an outlet port of the mold cavity.

7. The measurement method of claim 6, wherein the steps of measuring the front pressure and the rear pressure are performed outside the mold cavity.

8. The measurement method of claim 6, wherein the local permeability to porosity ratio of the preform between the first position and the second position is calculated based on the front pressure and the rear pressure.

9. The measurement method of claim 1, wherein the step of calculating the local ratio of permeability to porosity includes deriving the local permeability to porosity ratio of the preform inside the mold cavity.

10. The measurement method of claim 1, wherein the step of calculating the local ratio of permeability to porosity is performed based on the following expression:

$$\frac{\tilde{K}}{\tilde{\phi}} = \frac{\mu G}{P_0(t_n - t_{n-1})} \int_{X_{n-1}}^{X_n} \frac{x^2 - X_{n-1}x}{(Gx-1)} dx$$

where $$\frac{\tilde{K}}{\tilde{\phi}}$$

represents a local permeability to porosity ratio of the preform between the first position and the second position, $\mu$ represents a viscosity of the molding resin, $P_0$ represents the pressure difference, $t_{n-1}$ represents a first timing at which the flow front of the molding resin is at the first position, $t_n$ represents a second timing at which the flow front of the molding resin is at the second position, $X_{n-1}$ represent the first position, $X_n$ represents the second position, and x represents a travelling distance of the flow front, wherein the foresaid expression is an integral with respect to the first position and the second position of the flow front; and
   where G is expressed in the following equation:

$$G = \frac{K_{n-1}\phi}{K\phi_{n-1}X_{n-1}}$$

where $$\frac{K_n}{\phi_n}$$

is a constant, and $$\frac{K_{n-1}}{\phi_{n-1}}$$

represents a global permeability to porosity ratio between an inlet port of the mold cavity and the first position of the flow front.

11. The measurement method of claim 1, further comprising injecting the molding resin into the mold cavity at a constant pressure.

* * * * *